United States Patent
Rognoni et al.

(10) Patent No.: US 10,702,094 B2
(45) Date of Patent: Jul. 7, 2020

(54) DEVICE FOR CONTINUOUS HEATING OF FLUIDS

(71) Applicant: Gruppo Cimbali S.p.A., Binasco (IT)

(72) Inventors: Paolo Rognoni, Binasco (IT); Michele Tresoldi, Binasco (IT); Claudio Mosconi, Binasco (IT)

(73) Assignee: Gruppo Cimbali S.p.A., Binasco (MI) (IT)

( * ) Notice: Subject to any disclaimer, the term of this patent is extended or adjusted under 35 U.S.C. 154(b) by 334 days.

(21) Appl. No.: 15/659,399

(22) Filed: Jul. 25, 2017

(65) Prior Publication Data

US 2018/0020868 A1    Jan. 25, 2018

(30) Foreign Application Priority Data

Jul. 25, 2016  (IT) .................................. 102016771849

(51) Int. Cl.
| | |
|---|---|
| *A47J 31/44* | (2006.01) |
| *A47J 43/12* | (2006.01) |
| *B01F 5/06* | (2006.01) |
| *B01F 15/06* | (2006.01) |

(Continued)

(52) U.S. Cl.
CPC ....... *A47J 31/4489* (2013.01); *A47J 31/4485* (2013.01); *A47J 43/123* (2013.01); *B01F 5/0647* (2013.01); *B01F 15/063* (2013.01); *F28D 7/106* (2013.01); *F28D 7/14* (2013.01)

(58) Field of Classification Search
CPC ...... A47J 31/54; A47J 31/542; A47J 31/4485; A47J 43/123; A47J 31/4489; F24H 1/00; B29B 7/74; B29B 7/7423; F28D 7/14; F28D 7/106

See application file for complete search history.

(56) References Cited

U.S. PATENT DOCUMENTS

| 4,907,418 A * | 3/1990 | DeFazio ................. E04H 4/129 |
| | | 165/159 |
| 6,076,597 A * | 6/2000 | Manning ................. F28D 7/024 |
| | | 165/163 |

(Continued)

FOREIGN PATENT DOCUMENTS

| EP | 0 485 350 A1 | 5/1992 |
| GB | 2 265 445 A | 9/1993 |
| WO | 2014/195842 A2 | 12/2014 |

*Primary Examiner* — Brian W Jennison
(74) *Attorney, Agent, or Firm* — Seed IP Law Group LLP

(57) ABSTRACT

A device for continuous heating of fluids, using steam, includes a first tubular circuit, having one inlet and one outlet, in which to fluid or mixture of liquids with gases to be heated is circulated, and a second tubular circuit in which the heating steam is circulated. The first tubular circuit comprises a section that is helically wound around a section of the axial length of a hollow first cylindrical body, closed at both ends. The device further comprises a hollow second hollow cylindrical body in which said first cylindrical body and said helically wound section are coaxially housed. The second cylindrical body is closed at both ends and has radial passageways communicating between the cavity of said first cylindrical body and the cavity of said second cylindrical body. The first cylindrical body, second cylindrical body and radial passageways forming part of said second tubular circuit.

20 Claims, 4 Drawing Sheets

(51) Int. Cl.
 *F28D 7/10* (2006.01)
 *F28D 7/14* (2006.01)

(56) References Cited

U.S. PATENT DOCUMENTS

| | | | | |
|---|---|---|---|---|
| 6,499,534 | B1* | 12/2002 | Tawney | F28D 7/024 |
| | | | | 165/156 |
| 2008/0149317 | A1* | 6/2008 | Baker | F28D 7/022 |
| | | | | 165/163 |
| 2008/0264617 | A1* | 10/2008 | Martin | F28D 7/0066 |
| | | | | 165/154 |
| 2008/0271608 | A1* | 11/2008 | Morin | A47J 31/542 |
| | | | | 99/294 |
| 2009/0154909 | A1 | 6/2009 | Meyer | |
| 2010/0017952 | A1* | 1/2010 | Thweatt, Jr. | F28D 7/0066 |
| | | | | 4/493 |
| 2014/0299001 | A1 | 10/2014 | Rimpl | |
| 2015/0136368 | A1* | 5/2015 | Tandon | F28D 7/022 |
| | | | | 165/156 |
| 2016/0153719 | A1* | 6/2016 | Tokuda | F28F 7/02 |
| | | | | 165/140 |

* cited by examiner

DEVICE FOR CONTINUOUS HEATING OF FLUIDS

BACKGROUND

Technical Field

The present disclosure relates to a device for continuous heating of fluids, or mixtures of liquids with gases, using steam, comprising a first tubular circuit, having one inlet and one outlet, in which the fluid or mixture of liquids with gases to be heated is circulated, and a second tubular circuit in which the heating steam is circulated.

Particularly, the liquid to be heated may be milk or chocolate and the mixture with gases is preferably milk frothed with air.

Description of the Related Art

As used herein, the term continuous heating is intended to designate heating that is carried out while the two fluids, the fluid to be heated and the heating fluid, flow co-currently or counter-currently through the device, each in its own circuit.

In the prior art, for instance as disclosed in EP 0485350, the circuit, in the form of a tubular conduit, in which the fluid to be heated is circulated, is placed within the circuit, also in the form of a tubular conduit, in which steam is circulated and heat exchange occurs by convection and mainly by conduction between the walls of the tubular elements that form the circuits with the fluids flowing therein.

Nevertheless, this technical solution has the functional drawback that the steam condensate formed along the conduit cannot be easily removed from the steam flow because such flow, in this technical solution, forces the condensate to move along the outer perimeter of the conduit in which the liquid to be heated flows, and will likely cause it to build up toward the upper portion of the conduit.

The presence of condensate creates a heat-insulating effect which reduces heat exchange, and cannot ensure that liquid maintains a constant temperature during heating.

Furthermore, as condensate is dropped by gravity, the steam flow inlet may be blocked, and cause the flow to be irregular.

A different arrangement, which nevertheless requires part of the heating fluid, i.e. steam, to be introduced into the fluid to be heated, is disclosed in US 2014/0299001 A1. According to this arrangement, the tubular conduit for the flow of steam is concentrically placed within the tubular conduit for the flow of fluid to be heated, and a plurality of radial holes, arranged along the axial extent thereof and opening into the conduit of the fluid to be heated, are disposed in the wall of the steam conduit.

This known technical heating arrangement involves the drawback that water is added into the liquid to be heated, thereby diluting it.

This drawback is particularly significant if the liquid being heated is milk or a mixture of milk and air to provide frothed milk.

In fact, the impact of steam, though throttled, against the milk and air stream during heating, is deemed to be a cause of the impossibility of achieving highly compact foams, as is typical in cold frothing, due to the kinetic effect of steam molecules on the air molecules in the milk and air mixture.

Furthermore, the dilution of the protein contents in milk decreases the ability thereof to form foam.

BRIEF SUMMARY

The object of the present disclosure is to provide a device for continuous heating of fluids using steam without allowing it to be mixed with the fluid to be heated, thereby avoiding the kinetic effect associated with the water molecules in steam and the consequences of such effect on the milk and air mixture.

A further object is to allow removal of the condensed liquid without disassembling the device, thereby facilitating cleaning of the parts of the device and ensuring efficient and regular heating.

Also, according to an alternative embodiment of the device, a further object of the disclosure is to allow heating intensity to be adjusted as needed and according to the flow rate of the fluid to be heated as well as the nature and composition of the fluid itself.

These and other objects, as better explained hereafter, are fulfilled by the continuous heating device of the disclosure, as defined in the accompanying claim 1.

BRIEF DESCRIPTION OF THE SEVERAL VIEWS OF THE DRAWINGS

The disclosure will be now described in greater detail with reference to certain preferred embodiments thereof as shown in the annexed drawings, given by way of illustration and without limitation, in which.

DETAILED DESCRIPTION

Figure 2:
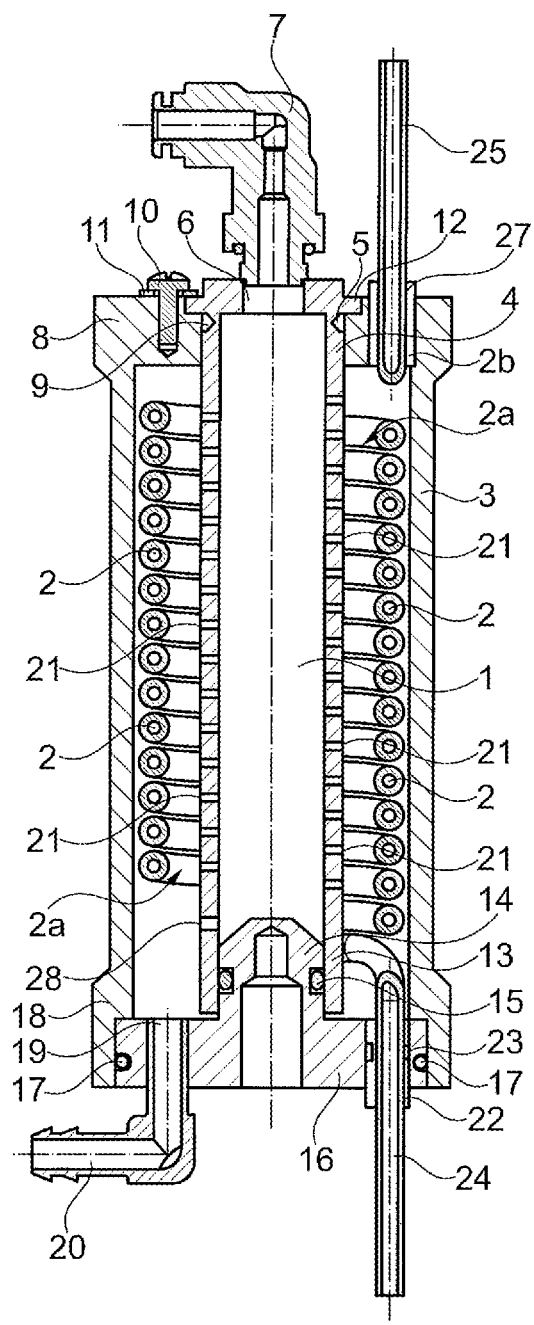
FIG. 2 shows a longitudinal sectional view of the device of FIG. 1.

Referring to the above figures, the heating device, according to its embodiment as shown in the longitudinal section of FIG. 2, comprises a first hollow cylindrical body 1 and a tubular section 2, which is helically would around at least one section of the axial length of said first hollow cylindrical body.

Preferably, the helically wound section consists of a steel or copper tube whose outside diameter ranges from 2.4 mm to 4.0 mm and whose inside diameter ranges from 2.0 mm to 3.6 mm.

The section that is wound into a cylindrical helix is part of the first tubular circuit for the flow of the heating fluid, particularly milk with or without the addition of air and extends, preferably but without limitation, to a length ranging from 700 mm to 1700 mm.

Preferably, the cylindrical shape that defines the section 2 wound around the first hollow cylindrical body 1 has an inside diameter that is greater than the outside diameter of said first hollow cylindrical body 1 and forms a gap 2a therewith.

The device further comprises a second hollow cylindrical body, referenced 3, which is part of the tubular circuit for the flow of the heating fluid, particularly steam. Said second cylindrical body 3 coaxially houses both said first hollow cylindrical body 1 and said helically wound section 2. The end 4 of the hollow body 1 is equipped with a flange-like closing wall 5 with a hole 6 connected to the connection 7 with a steam source, not shown and known per se.

The end 8, which is rigidly joined to the hollow cylindrical body 3, encloses the flange-like wall 5 and the end 4 of the hollow body 1, with a seal 9 interposed therebetween. Such flange-like wall 5 is fastened to the end 8 by screws 10 which engage, by means of respective washers 11, above the edge 12 of the flange-like wall 5 of the cylindrical body 1.

Figure 1:
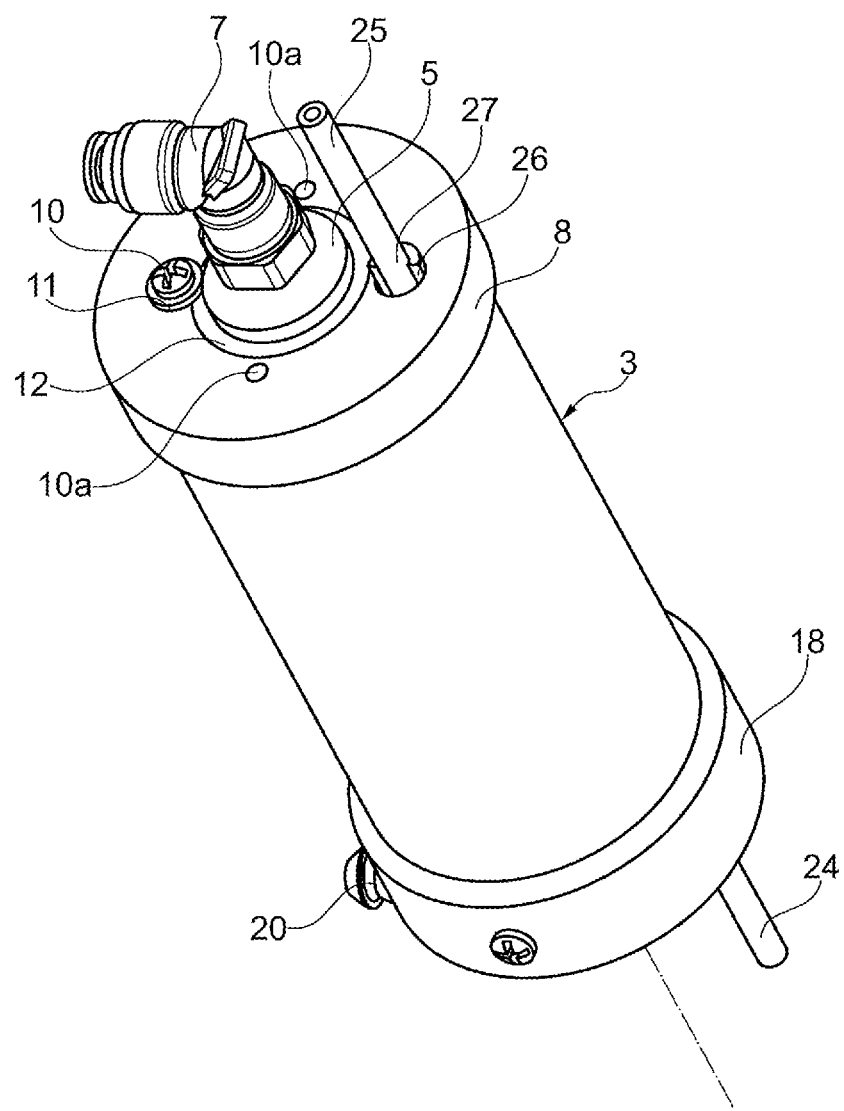
FIG. 1 shows a perspective view of the outer structure of the heating device.

The screws, like the one referenced 10 in FIGS. 1 and 2, are arranged around the edge 12 and engage in corresponding holes 10*a* formed on the end 8 of the cylindrical body 3.

The opposite end 13 of the cylindrical body 1 is closed by a shank 14 which axially fits into the cavity of the cylindrical body 1 with the interposition of an annular seal 15.

The shank 15 is rigidly joined to a flange 16 which closes the end 18 of the second hollow cylindrical body 3, with the interposition of an annular seal 17.

The flange 16 has an opening 19 with which the connection 20 is sealingly connected to allow the heating fluid and, as more clearly explained below, the condensate, to flow out of it and into the cavity of the second cylindrical body 3 through a plurality of radial passageways 21 formed in the wall of the first cylindrical body 1.

Preferably, these radial passageways consist of circular holes with a diameter ranging from 0.5 mm to 2.0 mm, which are axially and circumferentially arranged in the wall of the cylindrical body 1, and whose number depends on the heating requirements to be met by the device and, as a result, on the amount of steam to be dispensed.

The flange 16 also has a further passageway 22 through which the end 24 of the helically wound tubular section 2 sealingly fits, by means of a seal 23, the other end 25 coming out of the cylindrical body 3 through the opening 26, with a seal 27, formed in the end 8.

The end 24 and the end 25 respectively form the inlet and the outlet or conversely the outlet and the inlet of the first tubular circuit for the flow of fluid to be heated, particularly milk, which may or may not be frothed with air, and which comes from a source and is directed to a point of use thereof, not shown in the drawings.

Said first hollow cylindrical body 1, said second hollow cylindrical body 3 and said radial passageways 21 form part of said second tubular circuit.

According to the disclosure, the wall of the hollow cylindrical body 1 also has a through hole 28 that opens into the second hollow cylindrical body 3 external to the section 2 that is wound into a cylindrical helix and hence proximate to the opening 19 connected to the outlet connection 20 of the steam flow.

The through hole 28 has a diameter equal to or smaller than the diameter of the passageways 21 and has the purpose of discharging the condensate formed along the wall of the cylindrical body 1 and collected both by gravity and by pressure difference between the portions upstream and downstream from the heating fluid circuit.

The discharge occurs within said body 1 level with the outlet connection 20, and the condensate formed around the helically wound tubular conduit 2 also flows proximate thereto, after being removed by the steam flow that comes from the passageways 21 and radially impinges upon the walls of such helically wound conduit 2.

The walls, with their surfaces free of condensate, increase their heat exchange efficiency.

The flow rate of the heating fluid, particularly steam, may be adjusted in various manners.

One of these manners consists in the provision of an electrically controlled proportional variable-flow or a shape-memory valve, which is inserted, as is known in the art, in the steam feed conduit and is managed by a conventional control processing unit (CPU).

As an alternative to the use of the variable-flow valve, the flow of the heating steam may be adjusted by mechanically changing the number of passageways 21 that will be kept opened between the cylindrical body 1 and the cylindrical body 3.

Figure 3:
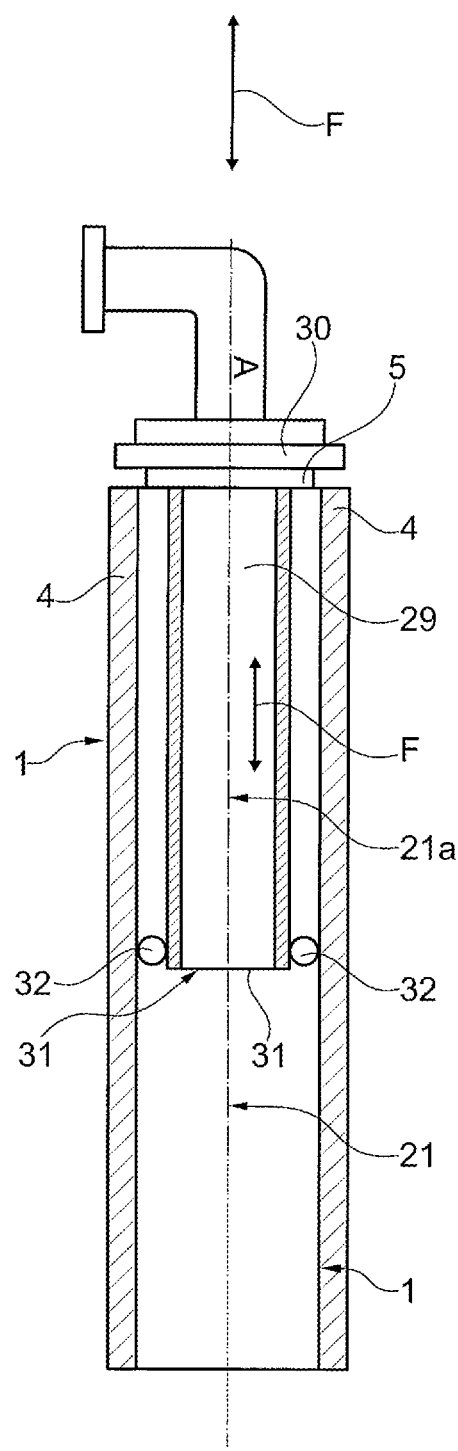
FIG. 3 schematically shows an alternative embodiment of the portion of the heating fluid conduit within the device that allows adjustment of the heating fluid flow.

Referring to FIG. 3, which schematically shows an alternative embodiment of the portion of the heating fluid conduit within the device, for adjustment of the flow of the heating fluid, it may be noted that the hollow cylindrical body 1 has means for closing at least one group of said radial passageways 21 and obviously leaving the remaining passageways open.

Still referring to FIG. 3, the device comprises a third hollow cylindrical body 29 penetrating the first hollow cylindrical body 1 through its end closed by the plate 8.

Said third cylindrical body 29 in turn comprises a closed end 30 thereof located outside said first hollow cylindrical body 1 and an opposite open end 31 located inside said first cylindrical body 1 and communicating with the cavity thereof.

Said third cylindrical body 29 is mounted in telescopically sliding fashion, as shown by the double arrow F, with a radial sealing effect relative to the cavity of said first cylindrical body 1, provided, for instance, by an O-ring 32, and can be axially locked in a given position according to the number of said radial passageways 21 to be kept closed, referenced 21*a*, between said radial seal 32 and the closed end of the flange 5 of the cylindrical body 1, Obviously, the connection 7 with the steam source shall be deemed to be mounted to the closed end 30 of the third hollow cylindrical body 29 and to open into it, possibly with a flexible element interposed therebetween, to allow axial movement of said third cylindrical body 29.

Figure 4:
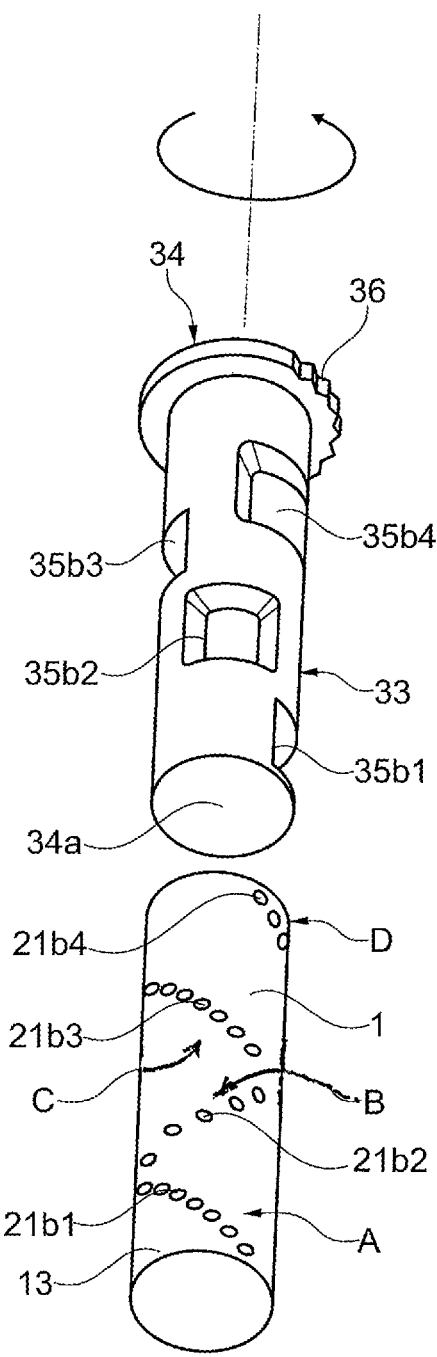
FIG. 4 schematically shows a further embodiment of the portion of the heating fluid conduit within the device that allows adjustment of the heating fluid flow.

A further embodiment of the portion of the heating fluid conduit within the device that allows adjustment of the heating fluid flow is schematically shown in FIG. 4.

Referring to this figure, it shall be noted that the wall of the hollow cylindrical body 1 has groups 21*b*1, 21*b*2, 21*b*3 and 21*b*4 of radial openings, separate from each other and disposed in respective helical arrangements, referenced A, B, C and D in FIG. 4, in the wall of the body 1. A different third cylindrical tubular body 33 is designed to be coaxially accommodated within the body 1.

Steam is conveyed to the body 33 at its end 34 via a flexible connection element, not shown. Said cylindrical body 33, whose bottom 34*a* is closed, has a series of windows 35*b*1 35*b*2, 35*b*3 and 35*b*4 formed therein, which have a 90° angular offset from each other and are axially spaced to correspond to as many helical sequences A, B, C and D of passageways 21*b*. As the cylindrical body 3 is angularly displaced, each of the windows 35*b*1, 35*b*2, 35*b*3 and 35*b*4 progressively opens the holes of the sequences of holes 21*b*1, 21*b*2, 21*b*3 and 21*b*4, thereby allowing a homogeneous distribution of steam in both radial and axial directions toward the conduit 2 for the flow of the fluid to be heated.

Each incremental adjustment interval corresponds, for each window, to an increasing and equal number of open passageways 21*b*.

As a result, the flow of steam is only conveyed to the passageways that communicate with their respective facing window, whereas all the other passageways are closed.

For easier selection of the angular position of the windows 35*b*1, 35*b*2, 35*b*3 and 35*b*4 and hence of steam diffusion within the body 1, a numbered ring nut 36 is provided on the end 34 of the tubular body 33. The angular displacement of the body 33 may be obtained manually or, alternatively, also by means of a motor, the amount of displacement being selected by programmed control of the CPU.

It will be appreciated from the above that the heating device of the present disclosure can provide programmed heating of the fluid to be heated and also achieves the purpose of effectively removing the condensate using the flow of steam itself, which flows along the the conduit for the fluid to be heated thereby ensuring high functionality of the device.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device for continuous heating of fluids using steam, comprising:
   a steam source;
   a first hollow cylindrical body in fluid communication with the steam source, including a first cavity formed by a first cylindrical wall closed at both ends;
   a second hollow cylindrical body in fluid communication with the first hollow cylindrical body, including a second cavity formed by a second cylindrical wall closed at both ends;
   a tube helically wound around the first hollow cylindrical body and including an inlet and an outlet, the tube and the first hollow cylindrical body received in the second cavity of the second hollow cylindrical body and aligned coaxially with the second hollow cylindrical body;
   a plurality of radial passageways extending through a first portion of the first cylindrical wall of the first hollow cylindrical body and in fluid communication with the first cavity of said first hollow cylindrical body and the second cavity of said second hollow cylindrical body;
   a first connection in fluid communication with the first cavity of said first hollow cylindrical body and the steam source;
   a second connection in fluid communication with the second cavity of said second hollow cylindrical body and an external environment;
   a first flow circuit including a first flow path through the tube from the inlet to the outlet of the tube; and
   a second flow circuit including a second flow path from the steam source, through the first connection, through the first cavity of the first hollow cylindrical body, through the plurality of radial passageways, and through the second cavity of the second hollow cylindrical body to the second connection.

2. The device as claimed in claim 1, wherein the first hollow cylindrical body includes a through hole extending through a second portion of the first cylindrical wall of the first hollow cylindrical body in fluid communication with the first cavity and the second cavity, the through hole being spaced from the plurality of radial passageways and positioned proximate the second connection.

3. The device as claimed in claim 1, wherein the tube is a single tube arranged in a cylindrical helix having an inside diameter that is greater than an outside diameter of said first hollow cylindrical body.

4. The device as claimed in claim 1, wherein the first flow circuit is configured to convey a fluid along the first flow path, wherein the fluid is a liquid.

5. The device as claimed in claim 4 wherein said liquid is milk.

6. The device as claimed in claim 4 wherein said liquid is chocolate.

7. The device as claimed in claim 1, wherein said fluid is a liquid and gas mixture.

8. The device as claimed in claim 7 wherein said liquid and gas mixture includes milk and air.

9. The device as claimed in claim 1, wherein a linear length of the tube is between 700 and 1700 mm.

10. The device as claimed in claim 1, wherein the tube is a cylindrical helix with an inside diameter between 2 and 3.6 mm.

11. The device as claimed in claim 1, wherein the tube is a cylindrical helix with an outside diameter between 2.4 and 4.0 mm.

12. The device as claimed in claim 1, wherein the tube is a cylindrical helix and at least one of the plurality of radial passageways is axially aligned with curves of the cylindrical helix.

13. The device as claimed in claim 1, further comprising:
   a fluid flow control device configured to regulate a flow of heating steam along the second flow path of the second flow circuit.

14. The device as claimed in claim 13, wherein the fluid flow control device is a variable-flow valve in fluid communication with the first connection and the steam source.

15. The device as claimed in claim 13, wherein the fluid flow control device is a third hollow cylindrical body received in the first cavity of the first hollow cylindrical body and configured to close at least one group of the plurality of radial passageways.

16. The device as claimed in claim 15, wherein the third hollow cylindrical body penetrates the first hollow cylindrical body through a respective opening formed in one closed end of the first hollow cylindrical body, said third hollow cylindrical body having a closed end located outside said first hollow cylindrical body and an open end located inside said first hollow cylindrical body, said open end in fluid communication with the first cavity of the first hollow cylindrical body, said third hollow cylindrical body including a radial seal relative to the first cavity of said first hollow cylindrical body, the third hollow cylindrical body configured to telescopically slide along the first cavity of the first hollow cylindrical body to close a selected number of the plurality of radial passageways between the radial seal and the closed end of the first hollow cylindrical body through which the third hollow cylindrical body penetrates the first connection being carried by the closed end of the third hollow cylindrical body and opening into the closed end of the third hollow cylindrical body.

17. The device as claimed in claim 13, wherein the fluid flow control device includes a third tubular cylindrical body having openings configured to convey fluid through a selected group of passageways of the plurality of radial passageways.

18. The device a claimed in claim 17, wherein the plurality of radial passageways in the wall of the first hollow cylindrical body are arranged in groups, wherein each group has a different helical distribution, and the third tubular cylindrical body is coaxially housed within the first hollow cylindrical body and configured to rotate therein, the openings of the third tubular cylindrical body being angularly offset by 90° from each other and axially spaced, such that the openings of the third tubular cylindrical body are configured to align with respective groups of passageways.

19. A device, comprising:
a first cylindrical body, including:
  a first cylindrical wall having a first end and a second end opposite the first end;
  a first cavity extending through the first cylindrical wall from the first end to the second end;
  a closing wall coupled to the first cylindrical wall at the first end, the closing wall including a hole in fluid communication with the first cavity; and
  a flange coupled to the first cylindrical wall at the second end, the flange including a shank extending into the first cavity and a first opening and a second opening positioned on opposite sides of the shank;
a second cylindrical body in fluid communication with the first cylindrical body, including:
  a second cylindrical wall having a first end and a second end opposite the first end, the first end of the second cylindrical wall sealed to the first end of the first cylindrical wall and the second end of the second cylindrical wall sealed to the flange; and
  a second cavity extending through the second cylindrical wall from the first end to the second end, the second cavity in fluid communication with the first opening of the flange;
a tube arranged in a helix and disposed around the first cylindrical body and including an inlet and an outlet, the inlet of the tube extending through the second opening of the flange and the outlet of the tube extending through the first end of the second cylindrical wall;
a plurality of radial passageways extending through a first portion of the first cylindrical wall of the first cylindrical body and in fluid communication with the first cavity and the second cavity;
a first connection coupled to the first cylindrical body and in fluid communication with the hole in the closing wall of the first cylindrical body, the first connection configured to receive steam;
a second connection coupled to the flange and in fluid communication with the first opening of the flange of the first cylindrical body, the second connection configured to discharge steam and condensate;
a through hole extending through a second portion of the first cylindrical wall of the first hollow cylindrical body, the through hole spaced from the plurality of radial passageways and aligned with the shank of the flange proximate the first opening of the flange, the through hole configured to discharge condensate from the first cavity to the second cavity to be discharged by the second connection;
a first flow circuit including the tube; and
a second flow circuit including the first connection, the first cavity, the plurality of radial passageways, the through hole, the second cavity, and the second connection.

20. The device of claim 19 further comprising:
a third cylindrical body received in the first cavity and in fluid communication with the first connection, the third cylindrical body configured to regulate transmission of steam along the flow path.

\* \* \* \* \*